United States Patent [19]
Wille et al.

[11] Patent Number: 5,537,392
[45] Date of Patent: Jul. 16, 1996

[54] PROCEDURE AND DEVICE FOR ROUTING TELECOMMUNICATIONS IN A MESHED NETWORK

[75] Inventors: Klaus Wille; Karl-Heinz Martin; Christian Kofler, all of München, Germany

[73] Assignee: Siemens Aktiengesellschaft, Munich, Germany

[21] Appl. No.: 302,845

[22] PCT Filed: Mar. 25, 1993

[86] PCT No.: PCT/DE93/00277

§ 371 Date: Sep. 16, 1994

§ 102(e) Date: Sep. 16, 1994

[87] PCT Pub. No.: WO93/19558

PCT Pub. Date: Sep. 30, 1993

[30] Foreign Application Priority Data

Mar. 26, 1992 [DE] Germany .......................... 42 09 906.4

[51] Int. Cl.⁶ ................................................. H04Q 3/66
[52] U.S. Cl. ........................... 370/14; 370/54; 370/94.3
[58] Field of Search ................................. 370/14, 16, 17, 370/54, 60, 60.1, 94.1, 94.3

[56] References Cited

U.S. PATENT DOCUMENTS

| | | | |
|---|---|---|---|
| 4,656,658 | 4/1987 | King | 379/221 |
| 4,873,517 | 10/1989 | Baratz et al. | 370/54 X |
| 4,884,263 | 11/1989 | Suzuki | 370/16 |
| 4,903,258 | 2/1990 | Kuhlmann et al. | 370/58.2 |
| 5,014,262 | 5/1991 | Harshavardhana | 370/16 |
| 5,018,097 | 5/1991 | Kuhlmann et al. | 364/900 |
| 5,031,093 | 7/1991 | Hasegawa | 370/16 X |
| 5,047,923 | 9/1991 | Elstner et al. | 364/200 |
| 5,095,480 | 3/1992 | Fenner | 370/94.1 |
| 5,142,531 | 8/1992 | Kirby | 370/94.3 |

FOREIGN PATENT DOCUMENTS

| | | |
|---|---|---|
| 0398614 | 11/1990 | European Pat. Off. . |
| 0426356 | 5/1991 | European Pat. Off. . |
| 0436201 | 7/1991 | European Pat. Off. . |
| 1487989 | 4/1969 | Germany . |
| 1512858 | 4/1969 | Germany . |
| 3626870 | 2/1987 | Germany . |

OTHER PUBLICATIONS

Siemens "HICOM 300 System Product Data", Ordering No. A19100–K3161–430–X–7600, pp. 55/56.
Siemens "Private Kommunikationssysteme, HICOM schafft Verbindungen" [Private communications systems, HICOM makes connections], Ordering No. A19100–K3160–A302, p. HICOM 300 Networking.
Siemens Aktiengesellschaft Private Communication Systems and Networks Division: "CorNet Signaling for ISDN Communication in Corporate Networks", Ordering No. A19100–K3110–G284–X–7600, Berlin and Munich 1987; CorNet functional specification.

*Primary Examiner*—Melvin Marcelo

[57] ABSTRACT

In a meshed network, telecommunication calls from a transmitting-end telecommunication terminal (A) are routed via an originating node (ON), via transit nodes (TN1, . . . , TN7) and a destination node (DN) to a receiving-end telecommunication terminal (B). To prevent network loops, the node which is immediately next on the route is determined in transit nodes on the basis of the originating node number and on the basis of the destination node identification number. The node numbers of all the nodes passed through can be inserted into the signaling information assigned to the telecommunication call, the following node on the route also being determined on the basis of the node numbers.

4 Claims, 5 Drawing Sheets

| DN / ON | ... | 28 | ... |
|---|---|---|---|
| ⋮ | | | |
| 20 | | 23,24 | |
| ⋮ | | | |

| DN / ON | ... | 28 | ... |
|---|---|---|---|
| ⋮ | | | |
| 20 | | 23,26 27,28 | |
| ⋮ | | | |

| ON- ..... -TN$_{x-1}$ | ON | | |
|---|---|---|---|
| | ... | 28 | ... |
| ⋮ | | | |
| 20 | | 23,24 | |
| ⋮ | | | |

| ON- ..... -TN$_{x-1}$ | ON | | |
|---|---|---|---|
| | ... | 28 | ... |
| ⋮ | | | |
| 20-21 | | 23,26,27,28 | |
| 20-22 | | 23,26,27,28 | |
| 20-21-23 | | 26,27,28 | |
| 20-21-26 | | 23,27,28 | |
| 20-21-25-26 | | 28 | |
| 20-21-25-27 | | 28 | |
| | | | |

PROCEDURE AND DEVICE FOR ROUTING TELECOMMUNICATIONS IN A MESHED NETWORK

BACKGROUND OF THE INVENTION

The term meshed networks refers to telecommunication networks without node ranking in which every node is connected to at least two further nodes. A fully meshed network is one in which every node is connected directly to every other node in the network. In a meshed network configuration with routing of telecommunication calls, in the event of so-called trunk group bottlenecks there is the danger of loop formation over several network nodes. If the trunk group bottleneck that led to the loop formation is not cleared, then the telecommunication call runs through the loop until all the paths are occupied.

A process for searching for an alternative path in a communication network is already known from the published European Patent Application having the application number 90125088.6. In the known process, first of all the entire network is checked for the failure of one or more nodes and/or the failure of one or more connection paths between two nodes. Following this, the nodes affected by the failures detected must be identified in every path. After that, a message called a "restoration message" which comprises an identification number of the transmitting node and identification numbers of the nodes affected by the failures must be formed. It must also be checked whether one of the aforesaid nodes is the terminal node of an alternative path. Finally, an alternative path through the communication network is determined. Overall, the known process requires a multiplicity of process steps, with the result that there is a considerable load on the controllers involved in the process.

A process termed "telecommunications network route selection" is already known from the published European Patent Application having the application number 90311577.2. A path from a message source to a message destination is selected here on the basis, inter alia, of so-called "busy/idle status information" which must be created and managed over the whole network. In conjunction therewith, in addition a so-called "source destination restriction map" is formed in network nodes in each case. For connections from specific source nodes to a further network node, such a table specifies which of the connection routes going out from this network node are permitted. However, network loops are not precluded here: it is possible for a connection route (e.g. "20") via which the call has already been routed (FIG. 1: 2-11-3-20-1-20 . . . ) to be specified as permitted for a connection from one source node (e.g. source "2") to the further node (e.g. "1").

Processes for establishing telecommunication calls are also already known from German Patent Specification DE 3,626,870 as well as from Laid-Open Publications 1,512, 858 and 1,487,989, in which it is provided to some extent that information indicating the originating exchange is inserted into the signaling information. However, this information does not serve to prevent the formation of loops in the known processes. In the process known from German Patent Specification DE 3,626,870, a digital telecommunication network is divided into so-called routing cells comprising a plurality of signaling points in each case. Within a routing cell, of the possible signaling routes, only specific signaling routes between the signaling points are progressively released for selection in the direction of the destination, whereby the circling of signaling messages within a routing cell is avoided. In the process known from German Laid-Open Publication 1,512,858, calls are routed over a relay station designed as a satellite, a free speech path in the forward direction being selected, and a busy signal with an identification signal that identifies the selected speech path and the originating exchange being transmitted to the destination exchange. In the process known from German Laid-Open Publication 1,487,989, additional information relating to the suitability of the path proposed and/or traveled is provided. Furthermore, this process also provides for the formation of information identifying the number of connection elements traveled, checking means being provided in transit exchanges to check this information, and further path searching being terminated once a predetermined maximum number of connection elements traveled on the respective path has been reached.

A communication system ("HICOM 300") that can form a network node in a meshed network is already known from the product publications of Siemens "HICOM 300 System Product Data", Ordering No. A19100-K3161-430-X-7600, pages 55/56, and "Private Kommunikationssysteme, HICOM schafft Verbindungen" [Private communication systems, HICOM makes connections], Ordering No. A19100-K3160-A302, page "HICOM 300 Networking". In the above systems, in the case of telecommunication calls to be established via transit nodes, a check may be provided in transit nodes as to whether a telecommunication call to the destination node is permitted on the basis of a node number identifying the destination node. With such establishment of telecommunication calls, however, there is the danger of network loops forming.

SUMMARY OF THE INVENTION

The object of the invention is therefore to state a process for routing telecommunication calls in a meshed network in which the danger of loop formation is reduced.

This object is achieved according to the invention by a process for routing telecommunication calls in a meshed line switching network, in which the telecommunication calls from a transmitting-end telecommunication terminal are routed via an originating node, via transit nodes and a destination node to a receiving-end telecommunication terminal. It is checked in the transit nodes on the basis of first information identifying the destination node whether a telecommunication call to the destination node is permitted. Second information identifying the originating node is inserted into signaling information assigned to the telecommunication call to be established. The node which is immediately next on the route is determined in the transit nodes on the basis of the second and first information.

The solution according to the invention does not require any modifications to the meshed network nor does it require intervention in the hardware structure of the network nodes, which are preferably designed as exchanges. The control program assigned to the network nodes need only be modified slightly. The solution according to the invention reduces or eliminates the danger of loop formation; at the same time the prerequisites for improved traffic capacity are thereby put in place.

Further advantageous embodiments of the invention are as follows.

For the telecommunication call to be established, in transit nodes to which the telecommunication call is routed, in each case third information identifying the respective transit node is inserted into the signaling information assigned to the telecommunication call. In transit nodes to which the telecommunication call is routed, the node which is immediately next on the route is determined on the basis of the first, second and third information.

In the case of the telecommunication call to be established, in each node to which the telecommunication call to be established is routed, the number of nodes previously passed through is incremented by the number "1". The number incremented by "1" is compared with a predeterminable first threshold value. The call to be established is then only routed to a further node if the number incremented by "1" is less than or equal to the first threshold value.

The telecommunication call to be established is routed between in each case two nodes via satellites. The number of connection path sections routed between two nodes via satellites is counted and compared with a second threshold value in the nodes. The telecommunication call to be established is then only routed to a further node via satellites if the number of connection path sections routed via satellites is less than or equal to the second threshold value.

Any node of the network can be connected to a network-external transmitting-end telecommunication terminal. This inserts its own second information indicating a fictitious originating node for this telecommunication terminal into the telecommunication call.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2a, 2b, and 3a and 3b show tables assigned to transit nodes in the network according to FIG. 1.

DESCRIPTION OF THE PREFERRED EMBODIMENT

Figure 1:
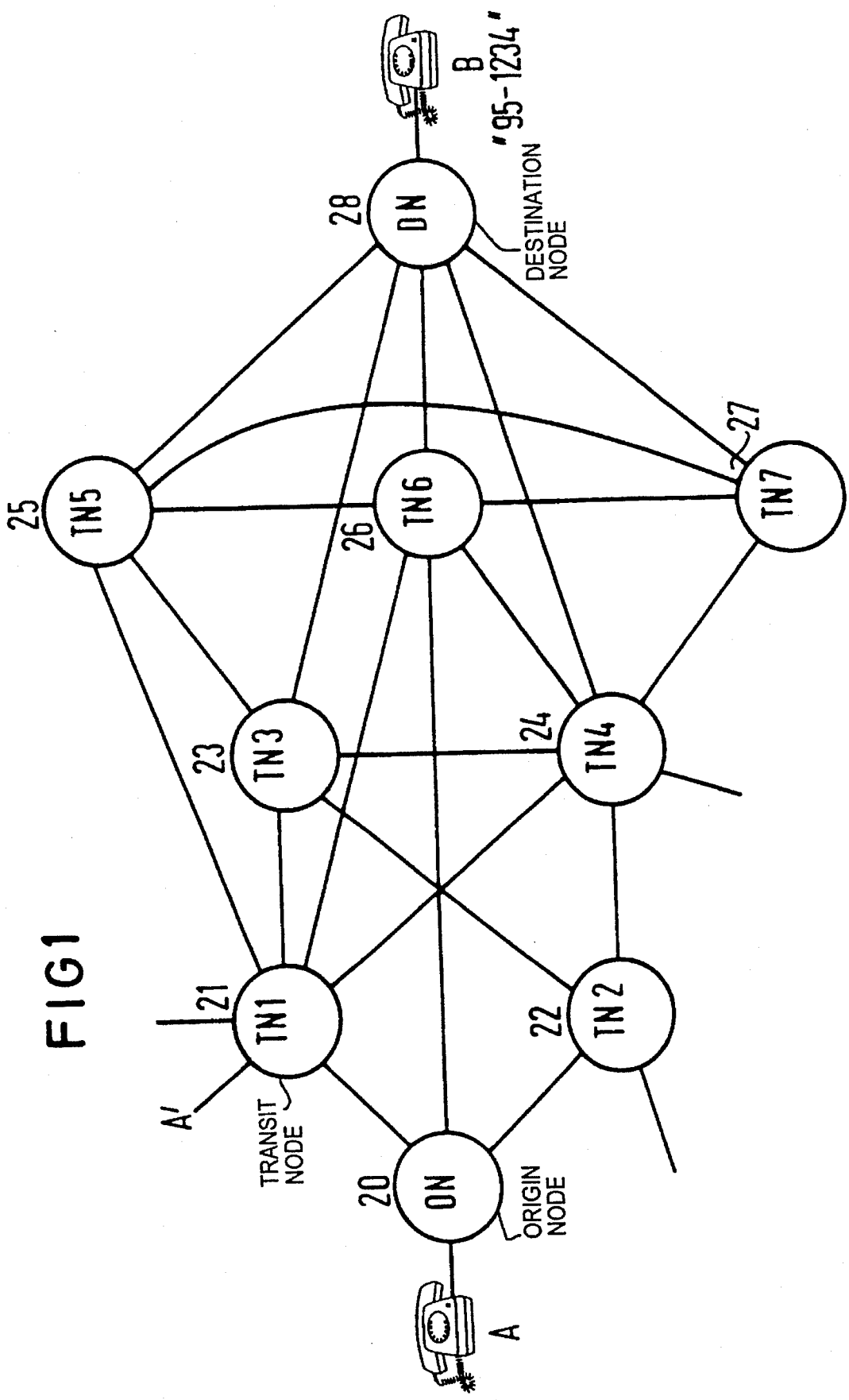
FIG. 1 shows a meshed network.

FIG. 1 shows a meshed network having a plurality of nodes, in which a telecommunication call is to be established from a telecommunication device A (for example telephone terminal, fax machine, etc.) to a telecommunication device B. The network nodes have the function of an originating node ON (origin node), of transit nodes TNx (transition node) and of a destination node DN. For example, seven transit nodes TN1 . . . TN7 are provided, which are connected to one another as shown in FIG. 1. It is thus possible to establish a telecommunication call between the telecommunication devices A and B over different paths: for example on the path ON-TN6-DN, ON-TN2-TN4-DN, and ON-TN2-TN3-TN5-TN7-TN6-DN.

These examples demonstrate that telecommunication calls can be established over different paths, over a differing number of nodes and links between the originating node ON and the destination node DN, that is between the devices A and B respectively. These options are provided as a result of the meshed structure of the network and a corresponding configuration of the network nodes, ON, TN1, . . . TN7, DN, to which a node-specific number KON, KTN1, . . . KTN7, KDN is assigned. For example, the node numbers 20 . . . 28 are assigned—as indicated in FIG. 1—to the nodes. The process according to the invention is initiated by the call number of the receiving-end telecommunication terminal B being input into the transmitting-end telecommunication terminal A. This B call number, for example 95-1234, comprises an identification number (here: 95) which indicates an extension area "95" for example, and also an extension number 1234.

In addition to the B call number (95-1234), information indicating the originating node number KON (here: 20) is also inserted into the signaling information of the telecommunication call to be established. The telecommunication call is now supplied in a manner known per se in accordance with the given network structure either to the transit node TN1, the transit node TN6 or the transit node TN2. It is now assumed that, as a result of the current traffic situation, the telecommunication call is routed from the originating node ON to the transit node TN2. For this, the corresponding signaling information, which—as already described—contains the B call number (95-1234) and also the originating node number KON (20), is supplied to the transit node TN2. The controller (CTN, FIG. 4) of the transit node TN2 assigns the identification number 95 contained in the B call number to the destination node number 28.

A table specifying the permissible connections depending on the originating node ON and destination node DN is assigned to each node. The connections are identified by, for example, the numbers of the nodes over which the permissible connections are to be routed. Examples of such tables are shown in FIG. 2 and FIG. 3. FIGS. 2a and 3a each show a table for the transit node TN2, and FIGS. 2b and 3b each show a table for the transit node TN4.

If then, as was described above, a telecommunication call proceeds to the transit node TN2 having the node number 22, then on the basis of the table illustrated in FIG. 2a), depending on the node number (20) for the originating node and depending on the node number (28) of the destination node, the controller of this node determines to which network nodes permissible connections can be established. These are, as shown in the table in FIG. 2a), the network nodes 23 and 24. In contrast, a connection from the node TN2 having the node number KTN2=22 to the originating node ON having the node number KON=20 is not permitted. The telecommunication call is therefore routed either to the node 23 or to the node 24. The process steps already performed in node TN2=22 are then performed in the nodes 23 or 24.

Figure 4:
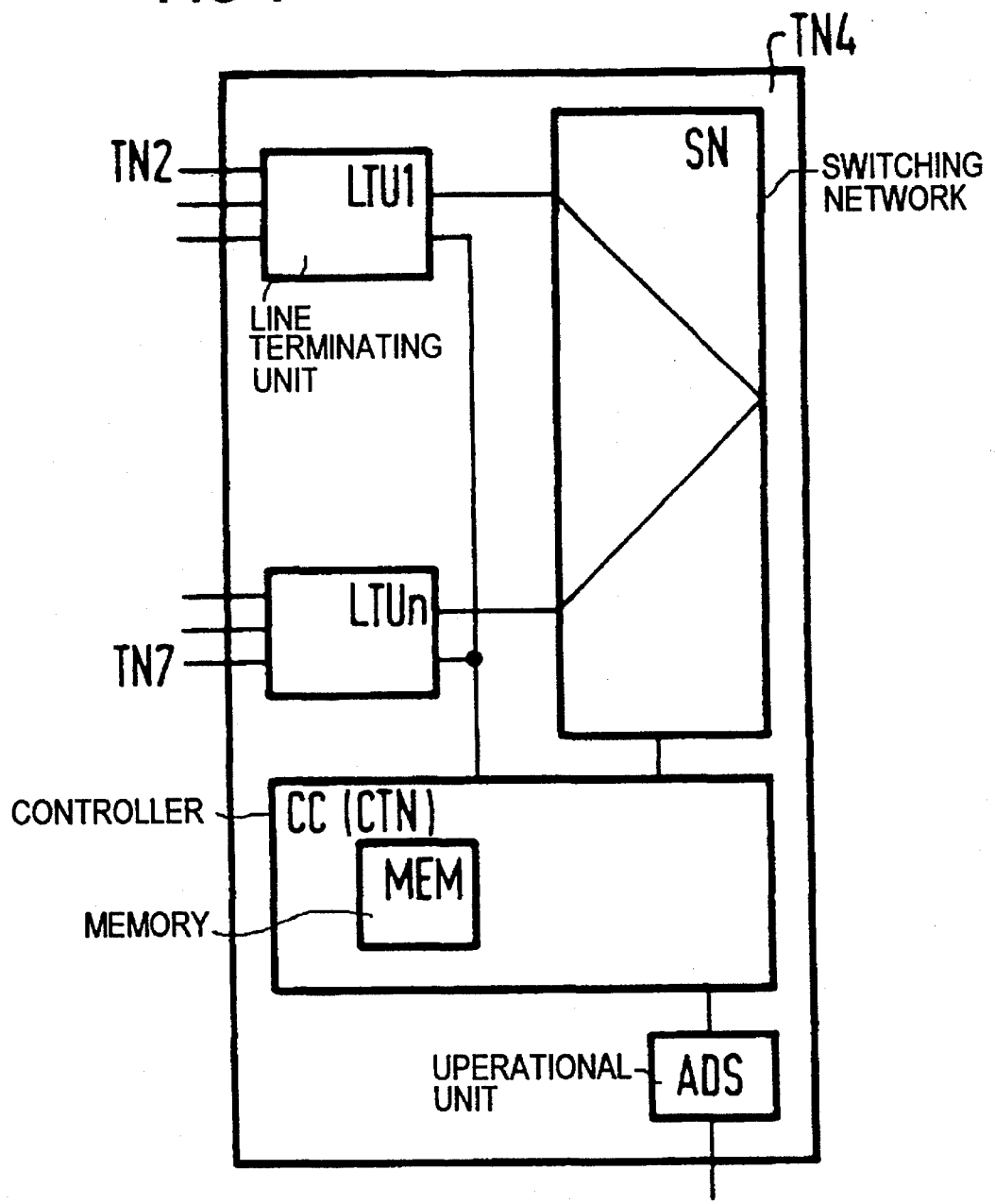
FIG. 4 shows a block circuit diagram of the components of a transit node according to FIGS. 1 and 2 which are involved in the realization of the process according to the invention.

In the node 24, the corresponding node controller (FIG. 4: CC (CTN)) accesses the table illustrated in FIG. 2b) and determines that nodes 23, 26, 27 and 28 are permissible next nodes. This eliminates the possibility of the telecommunication call to be established being routed back to the nodes 21 or 22.

The checking of the network node controllers for permissible paths to adjacent nodes is performed on the one hand, as already described, on the basis of the originating node number also transmitted in the signaling information. On the other hand, it is preferably provided that the destination node identification number ("direction identification number", here: 95), which was selected at the transmitting end and is likewise transmitted in the signaling information, is converted by the network node controllers into the destination node number (here: 28).

With the process set out above with reference to FIG. 2, therefore, the danger of network loop formation is reduced. The danger of network loop formation is eliminated by the following embodiment of the process according to the invention. It is provided therein that, for the telecommunication call to be established, a node number identifying the respective node is inserted into the signaling information assigned to the telecommunication call in every transit node through which the telecommunication call passes. In the case of a telecommunication call routed from the originating node ON="20" to the transit node TN2="22", as with the embodiment of the invention described with reference to FIG. 2a), the signaling information contains—apart from other information (FIG. 5)—only the node number of the originating node, but not the node number of a transit node that has been passed through.

In the transit node "22", therefore, the node numbers of the permissible nodes are determined on the basis of the node number "20" of the originating node ON and on the basis of the destination node number 28. These are the nodes 23 and 24. In the case of the first transit node 22 immediately following the originating node, the same permissible nodes 23 and 24 are therefore obtained as with the example illustrated with reference to FIG. 2a). FIG. 3b), in which the permissible nodes depending on the preceding network nodes and the destination node are shown in the same way as in FIG. 3a), shows exemplary combinations of originating nodes and preceding nodes for the network node TN4 (20, 20-22, 20-21-23, . . . ).

If, for example, the telecommunication call has been routed via the nodes 20 and 22, where the node number information "20" and "22" was inserted into the signaling information, then the call can be routed further alternatively via nodes 23, 26, 27 or 28. In contrast, connection paths via the nodes 21 and 22 are excluded so that any beginning or continuing network loops are prevented in these nodes.

The nodes are preferably communication systems disclosed in published European Patent Applications EP-A1-0 306 693 (U.S. Pat. No. 4,903,258, hereby incorporated by reference), EP-A2-0 303 870 (U.S. Pat. No. 5,018,097, hereby incorporated by reference) and EP-A1-0 363 869 (U.S. Pat. No. 5,047,923, hereby incorporated by reference). FIG. 4 shows only the components of the communication system required for understanding the invention: the system comprises a controller CC (CTN), a switching network SN and also line/trunk units LTU1 . . . LTUn. The line/trunk units comprise subscriber line circuits and trunk circuits. The subscriber line circuits are subscriber-oriented device interfaces, such as ISDN basic accesses for digital monofunctional and multifunctional terminals. The trunk circuits serve for the connection to public and/or private networks and are, for example, ISDN basic accesses for ISDN trunk traffic and ISDN internet traffic.

The subscriber line circuits and trunk circuits have the same internal system interfaces. They couple the individual basic channels, on which user data, that is to say speech and/or data information, are transmitted, to an optional selection from 2 multiplex channels having, for example, 32 channels of the switching network SN, and transfer the signaling information transmitted in a control channel to the controller CC (CTN) as an HDLC protocol. Assigned to the controller is a memory MEM in which the table information shown in FIG. 2 and FIG. 3 is stored. The table information can preferably be configured by means of administration commands to be input into an administration unit ADS. It is also possible to input into the unit ADS a first threshold value specifying a maximum number of links to be traveled in the network, and if necessary a second threshold value specifying a maximum number of satellite links to be traveled. The communication system illustrated in FIG. 4, which forms the node TN4 for example, establishes, inter alia, connections to adjacent nodes, for example to the nodes TN2 and TN7.

Figure 5A:
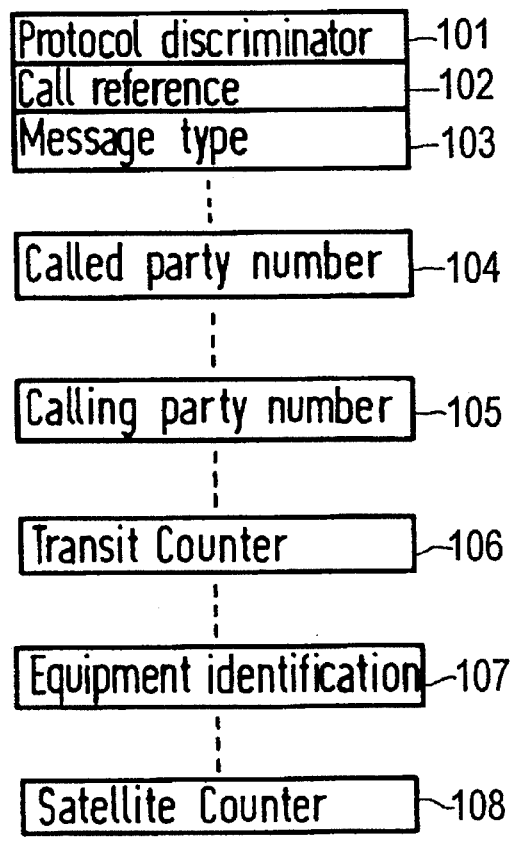
FIG. 5a and 5b show the structure of the signaling information formed by transit nodes according to FIGS. 1 to 3.

The meshed network illustrated in FIG. 1 may be, for example, a network for which the known CorNet protocol is implemented (Siemens Aktiengesellschaft Private Communication Systems and Networks Division: "CorNet Signaling for ISDN Communication in Corporate Networks", Ordering No. A19100-K3110-G284-X-7600, Berlin and Munich 1987; "CorNet functional specification "). The connection establishment message ("setup message") can be structured here as shown in FIG. 5a). The message comprises the following information elements here: protocol discriminator 101, call reference 102, message type 103, . . . . called party number 104, . . . calling party number 105, . . . transit counter 106, . . . equipment identification 107, . . . . satellite counter 108, . . .

The "protocol discriminator" information element specifies the protocol type, for example CorNet; "call reference" indicates a serial process number and "message type" indicates the type of signaling message, here: "connection establishment" (setup).

In addition to the actual call number, as already described the "called party number" (B call number) contains the area identification number (95) assigned to the destination node DN (28).

The "calling party number" information element indicates the A call number, which is supplemented by the identification number assigned to the originating node in the case of call number signaling in the open numbering scheme. If, in the process according to the invention, the originating node number is not contained in the signaling information or cannot be evaluated by a network node controller, the latter converts the originating node identification number into the originating node number during the evaluation of the tables according to FIGS. 2 and 3.

The "transit counter" information element indicates the number of nodes passed through.

The "equipment identification" information element, which is still to be described with reference to FIG. 5b), indicates the node number (20) of the originating node ON and if necessary also the numbers (for example -22-24-) of the nodes (TN2, TN4, . . . ) to which the telecommunication call has been routed (concatenation of the node numbers, FIG. 3b)).

The "satellite counter" information element indicates the current number of links traveled which are routed in each case between two network nodes via satellites, and also the maximum permissible number of the links ("second threshold value").

Figure 5B:
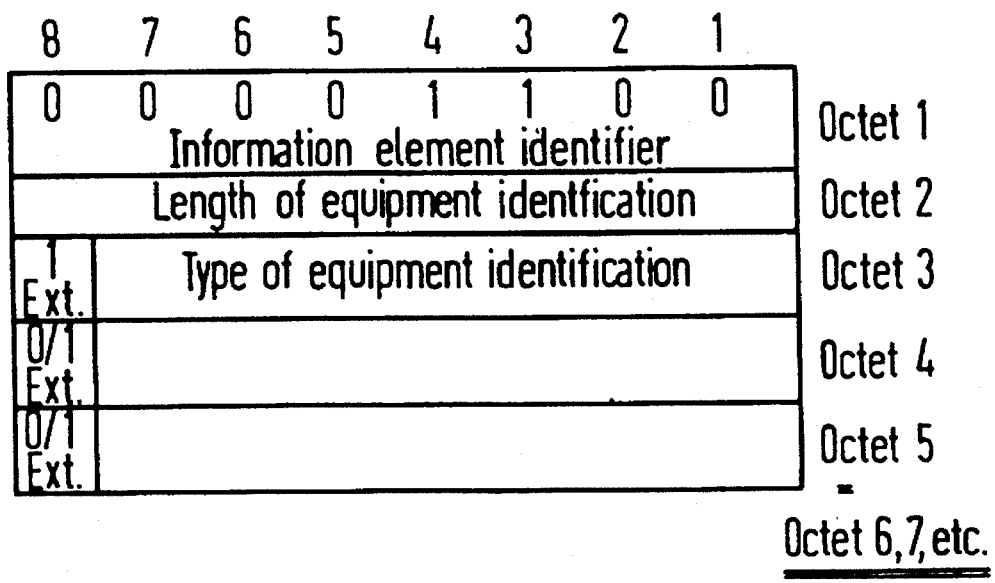

The structure of the "equipment identification" information element, comprising a plurality of parts each having 8 bits (octet 1 . . . ), is shown in FIG. 5b). An identifier specific to an information element is specified in octet 1 (information element identifier) for the "equipment identification" information element; the length of the information element (number of octets) is specified in octet 2. Octet 3 specifies that node numbers are specified in the following octets. This is the originating node number and the node numbers of further nodes passed through respectively. "1 Ext." or "0/1

Ext." at the 8th bit position indicates whether information specified in one octet is continued in the next octet.

Calls originating at a public exchange and to be routed to a receiving-end telecommunication terminal B connected to a network node are given a fictitious originating node number so that it is also possible to check trunk calls against the destination node number in each transit node by means of the node number. Calls from other nodes or networks that cannot signal the originating node number are likewise given a fictitious originating node number, on the basis of the setup of the incoming trunk group. In general it applies that any network node can be connected to a network-external transmitting-end telecommunication terminal A', in which case the network node forms a fictitious originating node number for A'.

It is furthermore provided in the process according to the invention that the number of nodes passed through, in particular the number of transit nodes passed through, are counted and compared with a predeterminable first threshold value. The call to be established is then only routed to a further node if the number of nodes to be passed through is less than a predetermined threshold value or is equal to this threshold value. The "transit counter" information element is provided (FIG. 5a) in the connection establishment information in order to realize this function. It can furthermore be provided that the call to be established is routed in each case between two nodes via satellites. Overall, a plurality of such connection paths between two network nodes in each case may be provided. In order to limit the number of the satellite links that may be occupied during the course of establishing a connection, a so-called SATELLITE counter (FIG. 5a) may be realized by means of appropriate software procedures. In this case the number of connection path sections routed between two nodes via satellites is counted. In the network nodes following the originating node, this numerical value is compared with a second threshold value. The telecommunication call to be established is then only routed to a further node via satellites if the number of connection path sections routed via satellites is less than a predetermined threshold value or is equal to the threshold value.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for routing telecommunication calls in a meshed line switching network, comprising the steps of:

routing the telecommunication calls from a transmitting-end telecommunication terminal via an originating node, via transit nodes and a destination node to a receiving-end telecommunication terminal;

checking in the transit nodes on the basis of first information identifying the destination node whether a telecommunication call to the destination node is permitted;

inserting second information identifying the originating node into signaling information assigned to the telecommunication call to be established, any node of said originating node, said transit nodes, and said destination node being connectable to a network-external transmitting-end telecommunication terminal, and inserting its own second information indicating a fictitious originating node for said network-external transmitting-end telecommunication terminal into the telecommunication call;

determining a next node of the transit nodes, which is immediately next on the route on the basis of the second and first information.

2. The process as claimed in claim 1, wherein for the telecommunication call to be established, for each transit nodes to which the telecommunication call is routed, third information identifying a respective transit node is inserted into the signaling information assigned to the telecommunication call, and wherein in transit nodes to which the telecommunication call is routed, a node which is immediately next on the route is determined on the basis of the first, second and third information.

3. The process as claimed in claim 1, wherein for the telecommunication call to be established, in each node to which the telecommunication call to be established is routed, the number of nodes previously passed through is incremented by the number "1", wherein the number incremented by "1" is compared with a predeterminable first threshold value, and wherein the call to be established is then only routed to a further node if the number incremented by "1" is less than or equal to the first threshold value.

4. The process as claimed in claim 1, wherein the telecommunication call to be established is routed between two of the origin, transit and destination nodes via satellites, wherein the number of connection path sections routed between two nodes via satellites is counted and compared with a second threshold value in the nodes, and wherein the telecommunication call to be established is then only routed to a further node via satellites if the number of connection path sections routed via satellites is less than or equal to the second threshold value.

* * * * *